US008772382B2

(12) United States Patent
Pelzl et al.

(10) Patent No.: US 8,772,382 B2
(45) Date of Patent: Jul. 8, 2014

(54) HEAVY METAL-FREE STABILIZER COMPOSITION FOR HALOGENATED POLYMERS

(75) Inventors: Bernhard Pelzl, Graz (AT); Michael Schiller, Arnoldstein (AT); Hendrik Willem Huisman, Voerendaal (NL)

(73) Assignee: Chemson Polymer-Additive AG, Arnoldstein (AT)

(*) Notice: Subject to any disclaimer, the term of this patent is extended or adjusted under 35 U.S.C. 154(b) by 70 days.

(21) Appl. No.: 13/131,232

(22) PCT Filed: Nov. 26, 2009

(86) PCT No.: PCT/EP2009/065926
§ 371 (c)(1),
(2), (4) Date: Sep. 8, 2011

(87) PCT Pub. No.: WO2010/060966
PCT Pub. Date: Jun. 3, 2010

(65) Prior Publication Data
US 2011/0311744 A1     Dec. 22, 2011

(30) Foreign Application Priority Data
Nov. 26, 2008 (DE) .................. 10 2008 058 901

(51) Int. Cl.
C08K 5/34     (2006.01)
(52) U.S. Cl.
USPC ............................................ 524/99; 524/101
(58) Field of Classification Search
USPC ................................................ 524/99, 101
See application file for complete search history.

(56) References Cited

U.S. PATENT DOCUMENTS

| | | | |
|---|---|---|---|
| 3,035,056 A | 5/1962 | Symes | |
| 4,039,485 A | 8/1977 | Argabright et al. | |
| 5,232,967 A | 8/1993 | Worschech et al. | |
| 5,312,941 A | 5/1994 | Razvan et al. | |
| 5,356,982 A | 10/1994 | Razvan et al. | |
| 5,519,077 A | 5/1996 | Drewes et al. | |
| 5,543,449 A | 8/1996 | Drewes et al. | |
| 2002/0103089 A1 | 8/2002 | Fukushima et al. | |
| 2003/0209696 A1 | 11/2003 | Reith et al. | |
| 2004/0054043 A1 | 3/2004 | Friedrich et al. | |
| 2004/0204522 A1* | 10/2004 | Austen et al. | 524/99 |
| 2009/0131564 A1* | 5/2009 | Wehner et al. | 524/100 |
| 2011/0311744 A1 | 12/2011 | Pelzl et al. | |

FOREIGN PATENT DOCUMENTS

| | | |
|---|---|---|
| AU | 2008286385 | 2/2009 |
| CN | 101 798 428 A | 8/2010 |
| DE | 41 06 404 C1 | 7/1992 |
| DE | 41 06 411 C1 | 7/1992 |
| DE | 42 04 887 A1 | 8/1993 |
| DE | 10 11 8179 | 10/2002 |
| DE | 10 2007 037 795 | 2/2009 |
| DE | 10 2008 058901 A1 | 5/2010 |
| EP | 0 256 872 A2 | 2/1988 |
| EP | 0 259 783 A2 | 3/1988 |
| EP | 0 542 720 A1 | 5/1993 |
| EP | 0 677 550 | 4/1995 |
| EP | 0 768 336 A2 | 4/1997 |
| EP | 1 343 838 A2 | 9/2003 |
| EP | 1 046 668 B1 | 1/2004 |
| EP | 1 466 941 | 10/2004 |
| JP | 53 081592 A | 7/1978 |
| JP | 60 040146 A | 3/1985 |
| JP | 05 179090 A | 7/1993 |
| JP | 05 295198 A | 11/1993 |
| JP | 07 062181 A | 3/1995 |
| JP | 11 129409 | 5/1999 |
| JP | 2001 200374 A | 7/2001 |
| JP | 2002 080876 A | 3/2002 |
| WO | WO 02/48249 A2 | 6/2002 |
| WO | WO 2006/136191 | 12/2006 |
| WO | WO 2012/126948 A1 | 9/2012 |
| WO | WO 2012/140054 A1 | 10/2012 |

OTHER PUBLICATIONS

International Search Report mailed Mar. 31, 2010 in PCT Application No. PCT/EP2009/065926, filed Nov. 26, 2009.
International Preliminary Report on Patentability dated Mar. 25, 2011 in PCT Application No. PCT/EP2009/065926, filed Nov. 26, 2009.
Chiron-Charrier, et al. 1993. Application of the study of reactivity of alkaline salts of isocyanuric acid to the synthesis of mono and trisubstituted isocyanurates. Synthetic Communications, Taylor & Francis Group, Philadelphia, PA. vol. 23, No. 19, pp. 2659-2672.
S. Cockett et al. Nov. 2005. Photoblueing von PVC-Profilen. Gummi Fasern Kunststoffe, vol. 58, pp. 704-710.
Gächter, R., & Müller, H. 1989. *Kunststoffadditive*. Carl Hanser Verlag, 3rd Ed., pp. 478-488 (German Table of Contents). English translated pp. 456-467 corresponds to pp. 478-488.
International Search Report mailed May 25, 2012 for International Application No. PCT/EP2012/055001 filed Mar. 21, 2012, 4 pages.
International Search Report mailed Jun. 5, 2012 for International Application No. PCT/EP2012/056540 filed Apr. 4, 2012, 4 pages.
Preliminary Amendment filed Sep. 18, 2013 for U.S. Appl. No. 14/006,092, filed Sep. 18, 2013, 10 pages.

* cited by examiner

*Primary Examiner* — Peter D Mulcahy
(74) *Attorney, Agent, or Firm* — Knobbe Martens Olson & Bear LLP

(57) ABSTRACT

The present invention relates to a stabilizer composition for halogen-containing polymers which is free from heavy metals, the use thereof in the stabilizing of halogen-containing polymers, in particular against an undesirable pink coloration, and shaped articles comprising this stabilizer composition.

23 Claims, 3 Drawing Sheets

HEAVY METAL-FREE STABILIZER COMPOSITION FOR HALOGENATED POLYMERS

CROSS-REFERENCE TO RELATED APPLICATIONS

This application is the U.S. National Phase of International Application No. PCT/EP2009/065926 entitled HEAVY METAL-FREE STABILIZER COMPOSITION FOR HALOGENATED POLYMERS, filed Nov. 26, 2009 and published on Jun. 3, 2010 as WO 2010/060966, which claims priority to German Patent Application No. DE 10 2008 058 901.2, filed Nov. 26, 2008.

The present invention relates to a stabilizer composition for halogen-containing polymers which is free from heavy metals, the use thereof in the stabilization of halogen-containing polymers, in particular against an undesirable pink coloration, and shaped articles comprising this stabilizer composition.

Halogen-containing polymers or plastics or shaped articles produced therefrom tend to undergo substantial changes during their production process and due to the action of environmental influences. For example, this type of plastics can decompose or discolor under the influence of heat and/or light. The most diverse substances or substance mixtures have therefore already been used for stabilizing halogen-containing polymers.

A halogen-containing polymer, such as e.g. polyvinyl chloride (PVC), is converted into a polyene structure during melt forming, hydrochloric acid being eliminated and the polymer becoming discolored. In order to improve the heat stability of the polymer, it is conventional to incorporate metal carboxylates into the resin as stabilizers. However, since the incorporation of the stabilizers alone causes a blackening of the polymer during a relatively long melt forming process, it is general practice to add a co-stabilizer. A large number of combinations of inorganic and organic compounds are known as stabilizers for halogen-containing polymers. In recent years, however, nitrogen-containing compounds have increasingly come into the market as stabilizers. Nitrogen-containing stabilizer compounds have also been described in the patent literature.

For example, EP 1343838 describes the use of at least one perchlorate salt and an alkanolamine which can stabilize both against heat and against light.

EP 768 336 describes a stabilizer combination which contains a uracil and a perchlorate salt. Such combinations have been obtainable in the market for several years and show outstanding properties in the extrusion of PVC pipes. They have not become accepted in PVC window profiles and other exterior uses in which stability to weathering must be guaranteed because the market has reservations with respect to a pink discoloration during use.

DE 10118179 describes the use of a combination of specific nitrogen compounds which contain structural elements of aminocrotonates and uracils, an alkanolamine and a perchlorate salt which are distinguished by a very good stabilizing action in halogen-containing polymers both against oxidative, thermal and light-induced degradation. The color-stabilizing action under exposure to heat is particularly remarkable.

In JP 07062181 it has been discovered that systems of tin compounds, tris(2-hydroxyethyl) isocyanurate (THEIC) and perchlorate salts are particularly well-suited for stabilizing chlorine-containing polymers, in particular PVC. Nevertheless, in the case of tin, this is a heavy metal.

JP 05179090 in turn describes that mixtures of at least THEIC and a perchlorate-containing hydrotalcite in the presence of silicate are particularly suitable for stabilizing chlorine-containing polymers, in particular PVC. However, the examples given contain metal soaps which, at least in the case of zinc, contain a heavy metal.

JP 05295198 reports on combinations of THEIC and perchlorate-salts or perchlorate-containing hydrotalcites for stabilizing PVC. Here also the examples given contain heavy metals, such as barium and zinc.

It has been found, however, that with such polymers stabilized with nitrogen compounds, which in some cases contain only small amounts of titanium dioxide, a pink discoloration of the polymer occurs in sunlight and also in artificial light. This pink discoloration has hitherto prevented the use of nitrogen-containing compounds in window profiles. The coloring component of this pink discoloration can be neither analyzed nor produced in a suitable amount by simulation, since the change in color results from the degradation of the halogen-containing polymer by complex and unknown mechanisms, which depend not only on the nature and intensity of the degrading sources, but also on the nature and the amounts of each substance contained in the polymer composition, in particular, for example, on the nitrogen-containing compounds or $TiO_2$.

The present invention is therefore based on the object of providing novel stabilizer compositions which are free from heavy metals and are suitable in particular for halogen-containing polymers, without having the abovementioned disadvantages of the known stabilizers.

This object is achieved according to the invention by the provision of an isocyanurate stabilizer composition for halogen-containing polymers which is free from heavy metals, containing at least one isocyanurate, at least one dihydropyridine and at least one perchlorate salt.

It has been found, surprisingly, that the stabilizer compositions according to the invention which are free from heavy metals impart to halogen-containing polymers and the parts and products produced therefrom an increased stability to the action of sunlight and artificial light. In particular, a pink discoloration of the halogen-containing material can be prevented when it is employed in applications used in the open, for example in window profiles. It has furthermore been found that by using the stabilizer compositions according to the invention, which are free from heavy metals, shaped articles can be produced without problems from polymers, which render possible an optimum performance in use and which are comparable to the commodities for PVC stabilization based on stabilizer compositions containing heavy metals. This stabilizing effect also arises when the halogen-containing polymer contains further stabilizers, co-stabilizers or auxiliary substances.

With the stabilizer compositions of the present invention it is furthermore possible to dispense with heavy metal compounds entirely and nevertheless to achieve the same or even a better stability of the halogen-containing polymers. As a result, any stresses on the environment can be reduced and costs for expensive disposal, for example, can be avoided. "Free from heavy metals" in the context of the present invention means that all elements with a density >4.51 $g/cm^3$ (at 20° C.) are not present in the stabilizer composition. In a further embodiment, the term heavy metal additionally includes the elements strontium and barium.

The present invention also provides the use of the stabilizer composition according to the invention which is free from heavy metals for stabilizing halogen-containing polymers, and shaped articles from these halogen-containing polymers which comprise a stabilizer composition according to the invention which is free from heavy metals.

Figure 1:
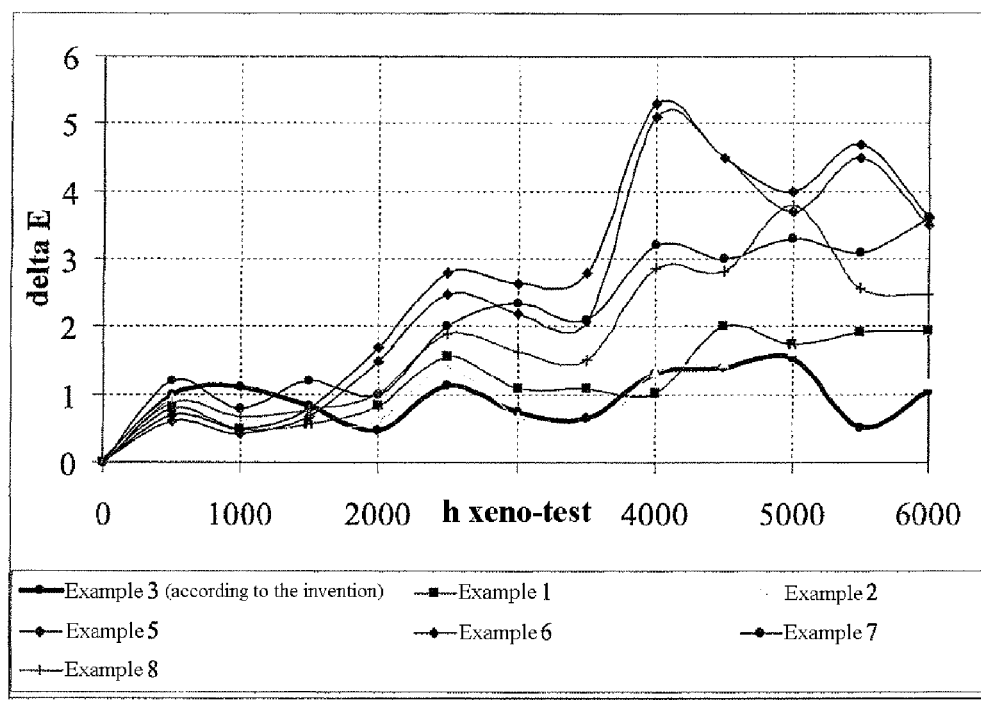
FIG. 1 shows the change in the overall color ΔE of a halogen-containing polymer as a function of the weathering in the xeno-test.

The present invention is described in more detail in the following.

The isocyanurate-based stabilizer composition of the present invention can be used for halogen-containing polymers. Examples of such halogen-containing polymers can be thermoplastic halogen-containing polymers, for example, without being limited thereto, polyvinyl chloride (PVC), polyvinylidene chloride, chlorinated or chlorosulfonated polyethylene, chlorinated poly-propylene or chlorinated ethylene/vinyl acetate copolymer or similar compounds. Polymers of the PVC type, i.e. vinyl chloride homopolymers and copolymers of vinyl chloride with other monomers, are particularly advantageous.

The stabilizer compositions according to the invention which are for halogen-containing polymers and are free from heavy metals contain at least one isocyanurate. The at least one isocyanurate is chosen from the compounds of the formula (I)

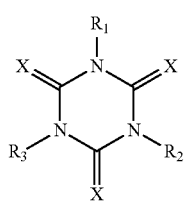

(I)

In formula (I), $R_1$, $R_2$ and $R_3$ independently of each other denote hydrogen, optionally substituted $C_1$-$C_{18}$ alkyl, optionally substituted $C_2$-$C_6$ alkenyl, optionally substituted $C_1$-$C_4$ alkoxy, optionally substituted $C_5$-$C_8$ cycloalkyl, optionally substituted $C_3$-$C_8$ alkylcycloalkyl or optionally substituted $C_5$-$C_{10}$ aryl. X in formula (I) is chosen independently from S or O.

The term "alkyl" relates to completely saturated aliphatic, linear or branched hydrocarbons. In particular embodiments, an alkyl contains 1 to 18 carbon atoms. A numerical range of from, for example, 1 to 18 means, whenever it arises, that, for example, $C_1$-$C_{18}$ alkyl relates to an alkyl group which contains 1 carbon atom, 2, 3, 4, 5, 6, 7, 8, 9, 10, 11, 12, 13, 14, 15, 16, 17 or, respectively, 18 carbon atoms. The alkyl group can be optionally substituted. Examples of alkyl compounds include, but are not limited thereto, methyl, ethyl, n-propyl, isopropyl, n-butyl, isobutyl, sec-butyl, tert-butyl, pentyl, hexyl, heptyl, octyl and the like.

The term "alkenyl" relates to aliphatic hydrocarbons having one or more double bonds. In particular embodiments an alkenyl contains 2 to 6 carbon atoms, i.e. 2, 3, 4, 5 or 6 carbon atoms. The alkenyl group can be optionally substituted. Examples of alkenyl compounds include, but are not limited thereto, ethenyl, propenyl, 1,4-butadienyl and the like.

The term "alkoxy" relates to aliphatic hydrocarbons having an —O-alkyl unit. In particular embodiments an alkoxy contains 1 to 4 carbon atoms, i.e. 1, 2, 3 or 4 carbon atoms. The alkoxy group can be optionally substituted. Examples of alkoxy compounds include, but are not limited thereto, methoxy, ethoxy, propoxy, tert-butoxy and the like.

The term "cycloalkyl" relates to cyclic saturated hydrocarbons. In particular embodiments a cycloalkyl contains 5 to 8 carbon atoms, i.e. 5, 6, 7 or 8 carbon atoms. The cycloalkyl group can be optionally substituted. Examples of cycloalkyl compounds include, but are not limited thereto, cyclopentane, cyclohexane, cycloheptane, cyclooctane and the like.

The term "alkylcycloalkyl" relates to cyclic saturated hydrocarbons which are bonded to the main rig via an alkyl group. In particular embodiments an alkylcycloalkyl contains 3 to 8 carbon atoms, i.e. 3, 4, 5, 6, 7 or 8 carbon atoms. The alkylcycloalkyl group can be optionally substituted. For example, at least 1 ring atom can be a hetero atom. The at least one hetero atom can be chosen from oxygen, nitrogen, sulfur and phosphorus, but is not limited thereto. Examples of alkylcycloalkyl compounds include, without being limited thereto, glycidyl, benzyl and the like.

The term "aryl" relates to an aromatic ring in which each ring atom is a carbon atom. Aryl rings can be built up from five, six, seven, eight, nine, ten or more carbon atoms. For example, aryl compounds can have up to 15 carbon atoms. The aryl group can be optionally substituted. Examples of aryl compounds include, but are not limited thereto, cyclopentadienyl, phenyl, and the like. Heteroaryls can also fall under the general definition of aryl. The term "heteroaryl" relates to an aromatic heterocycle, wherein the heteroaryl rings can be built up from 5, 6, 7, 8, 9 or more atoms, at least ring atom being a hetero atom. The at least one hetero atom can be chosen from oxygen, nitrogen, sulfur and phosphorus, but is not limited thereto. The heteroaryl group can be optionally substituted. Examples of heteroaryl compounds include, but are not limited thereto, furan, pyridine, thiophene and the like.

The term "optionally substituted" relates to a group in which one or more hydrogen atoms are replaced by a substituent. The substituent can be alkyl, alkoxy, cycloalkyl, aryl, heteroaryl, OH, CN, F, Cl, Br, I, $NO_2$ or an amine, but is not limited thereto.

In one embodiment of the present invention, $R_1$, $R_2$ and $R_3$ independently of each other are —$CH_3$, —$CH_2CH_3$, —$CH_2CH_2CH_3$, —$CH_2CHCH_3$, —$CH_2OH$, —$CH_2CH_2OH$, —$CH_2CH_2CH_2OH$, —$CH_2$ ($C_2H_3O$).

In one embodiment, X=O.

Examples of isocyanurates are, without being limited thereto,

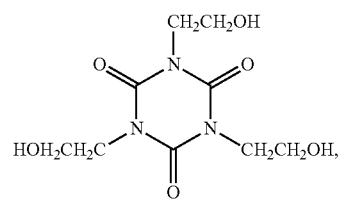

-continued

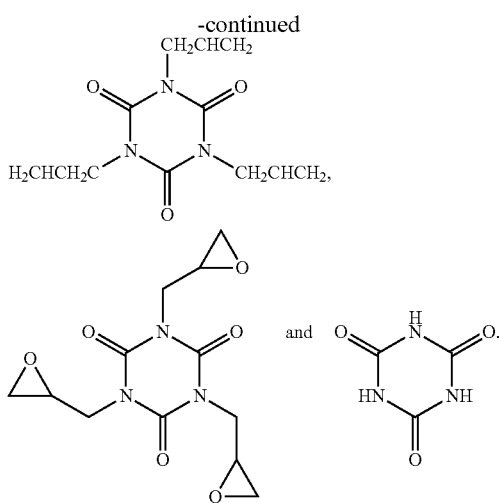

In one embodiment of the present invention, the isocyanurate is

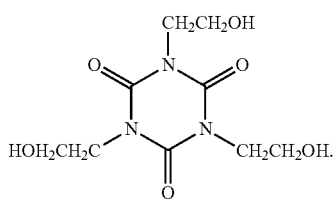

The isocyanurate-based stabilizer compositions according to the present invention which are for halogen-containing polymers and are free from heavy metals contain at least one dihydropyridine which is chosen from the compounds of the formula (II) and (III)

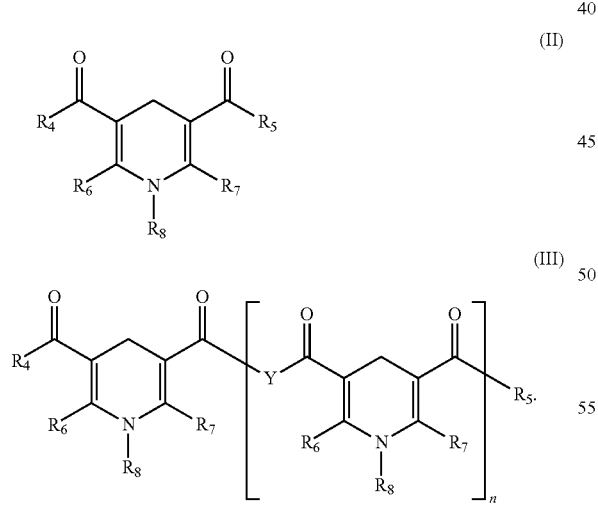

$R_4$, $R_5$, $R_6$, $R_7$ and $R_8$ are independently of each other H, optionally substituted $C_1$-$C_{18}$ alkyl, optionally substituted $C_2$-$C_6$ alkenyl, optionally substituted $C_1$-$C_4$ alkoxy, optionally substituted $C_5$-$C_8$ cycloalkyl or optionally substituted $C_5$-$C_{10}$ aryl, according to the definitions given above.

Y is $C_1$-$C_{18}$ alkyl, wherein one or more carbons can be substituted by O or S. Thus, in one embodiment of the invention Y can be chosen from $(CH_2)_x$, $(CH_2)_x$—O—$(CH_2)_y$ and $(CH_2)_x$—S—$(CH_2)_y$, wherein x and y independently are an integer from 1 to 10, i.e. 1, 2, 3, 4, 5, 6, 7, 8, 9 or 10. In one embodiment, x and y are each 1, 2 or 3.

n is an integer from 1 to 5, for example 1, 2, 3, 4 or 5. In one embodiment, n is 1, 2 or 3.

In one embodiment of the present invention, $R_4$, $R_5$, $R_6$, $R_7$ and $R_8$ can be chosen independently from —$CH_3$, —$C_2H_5$, —$C_8H_{17}$, —$C_{16}H_{33}$, —$C_{17}H_{35}$, —$C_{18}H_{37}$, $C_6H_5$, —$OCH_3$, —$OC_2H_5$, —$OC_{12}H_{25}$.

Examples of dihydropyridines are, without being limited thereto,

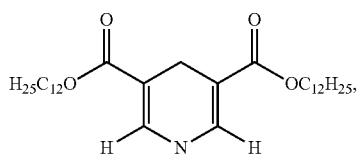

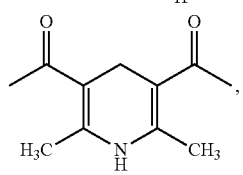

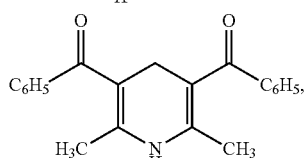

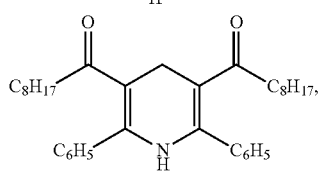

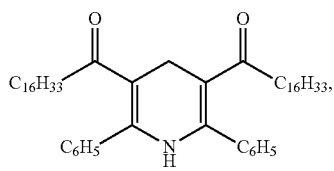

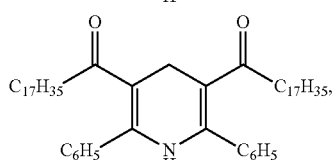

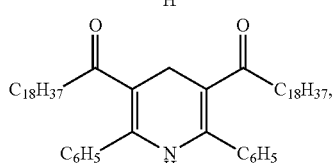

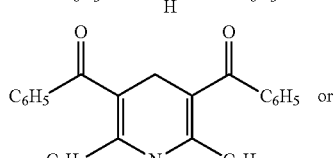 or

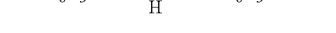

-continued

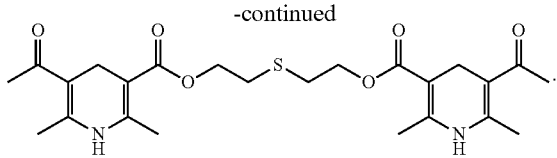

The isocyanurate-based stabilizer compositions according to the invention which are for halogen-containing polymers and are free from heavy metals contain at least one perchlorate which is chosen from the compounds of the general formulae (IV) and (V)

$$M(ClO_4)_k \qquad (IV)$$

$$M_xAl_2(OH)_{2x+4}(CO_3)_{1-z/2}(ClO_4)_z \cdot mH_2O \qquad (V).$$

M represents a metal atom which is free from heavy metals. For example, M can be chosen from Li, Na, K, Mg, Ca or Al. In one embodiment, M is Na, Mg or Al.

k is an integer from 1 to 3, for example 1, 2 or 3. x is an integer from 1 to 6, for example 1, 2, 3, 4, 5 or 6. z is a number in the range of from 0.01 to 2.

The compounds of the formula (V) can be called, for example, minerals, such as hydrotalcites, hydrocalumites, ettringites, granates, dawsonites. In one embodiment, M can be Li, Na, K, Mg or Ca.

Examples of perchlorates are, without being limited thereto, $NaClO_4$, $Ca(ClO_4)_2$, $Mg(ClO_4)_2$ or $Al(ClO_4)_3$. Further examples of compounds of this group are Alcamizer 5 and Alcamizer 5-2 from Kyowa.

In the present invention, "isocyanurate-based" means that one or more isocyanurate(s) are the main component of the stabilizer composition. Main components are understood as meaning the components which chiefly contribute towards stabilization of the halogen-containing polymer, i.e. the said components isocyanurate, dihydropyridine and perchlorate salt. Any further components present which have a stabilizing action are contained in a lower amount. In one embodiment of the present invention, the isocyanurate-based stabilizer composition contains no uracils and/or aminocrotonates.

Stabilizer compositions according to the present invention can be added to the halogen-containing polymer in various amounts. The dihydropyridine can be added in an amount of from approximately 0.01 to approximately 1.0 part per 100 parts of resin ("per hundred of resin"=phr). In one embodiment, the dihydropyridine can be added in an amount of from approximately 0.1 to approximately 0.5 phr, for example in an amount of from approximately 0.1 to approximately 0.3 phr, i.e. for example approximately 0.1, 0.15, 0.2, 0.25 or 0.3 phr. The isocyanurate can be added in an amount of from approximately 0.01 to approximately 5.0 parts per 100 parts of resin (phr). In one embodiment, the isocyanurate can be added in an amount of from approximately 0.1 to approximately 3.0 phr, for example in an amount of from approximately 0.5 to approximately 1.5 phr, for example approximately 0.5, 0.6, 0.7, 0.8, 0.9, 1.0, 1.1, 1.2, 1.3, 1.4 or 1.5 phr. The perchlorate can be added in an amount of from approximately 0.01 to approximately 1.0 part per 100 parts of resin (phr). In one embodiment, the perchlorate can be added in an amount of from approximately 0.05 to approximately 0.5 phr, for example in an amount of from approximately 0.1 to approximately 0.3 phr, i.e. for example approximately 0.1, 0.15, 0.2, 0.25 or 0.3 phr. Each of the abovementioned values can be assumed to be the initial value and, respectively, the end value of a range.

Any combinations of the abovementioned stated amounts are possible in the present invention.

The stabilizer composition according to the present invention can be added in total in an amount of from approximately 0.01 to approximately 10.0 parts per 100 parts of resin (phr). In one embodiment, the stabilizer composition is added in an amount of from approximately 0.05 to approximately 8.0 phr, for example in an amount of from approximately 0.5 to approximately 5.0.

The stabilizer composition which is free from heavy metals and is used according to the invention can be added individually to the polymer or to the polymer mixture. However, it is also possible to add the combination according to the invention which is free from heavy metals to the polymer or a polymer mixture together with other (co)-stabilizers or the auxiliary substances mentioned below. For example, metering in the extruder, e.g. in the vacuum zone, is also included in the present invention.

The stabilizer composition according to the invention which is free from heavy metals can furthermore be combined with one or more additional additives, such as, for example, primary stabilizers, co-stabilizers, zeolites, antioxidants, fillers, plasticizers, dyestuffs, pigments, antistatic agents, surface-active agents, foaming agents, impact modifiers, UV stabilizers, lubricants, processing agents or the like.

Co-stabilizers are compounds which provide a further stabilizing contribution for halogen-containing polymers when used in the stabilizer composition according to the present invention. Possible co-stabilizers can be chosen from the group consisting of 1,3-diketone compounds, polyols, metal salts, natural or synthetic minerals, such as hydrotalcites, hydrocalumites and zeolites, amino acid derivatives, organic esters of phosphorous acid, epoxy compounds.

Examples of 1,3-diketone compounds include, but are not limited thereto, dibenzoylmethane, stearoylbenzoyl-methane, palmitoylbenzoylmethane, myristoylbenzoyl-methane, lauroylbenzoylmethane, benzoylacetone, acetylacetone, tribenzoylmethane, diacetylacetobenzene, p-methoxystearoylacetophenone, acetoacetic acid esters and acetylacetone and metal salts thereof, in particular those of lithium, sodium, potassium, calcium, magnesium, titanium and/or aluminum.

Co-stabilizers from the group of polyols include, but are not limited thereto, glycerol, pentaerythritol, di- and tripentaerythritol, trismethylolpropane (TMP), di-TMP, sorbitol, mannitol, malititol, saccharides, disaccharides (in particular sucrose, 4-O-β-D-galactoyranosyl-D-glucose, 4-O-alpha-D-glucopyranosyl-D-glucose, 6-O-(6-deoxy-alpha-L-mannopyranosyl)-D-glucose, alpha-D-glucopyranosyl-alpha-D-gluco-pyranoside, 6-O-alpha-D-glucopyranosyl-D-glucose, 4-O-β-D-glucopyranosyl-D-glucose, 2-O-β-D-glucopyranosyl-D-glucose, 6-O-alpha-D-glucopyranosyl-D-glucitol, 3-O-alpha-D-glucopyranosyl-D-fructose, 6-O-β-D-glucopyranosyl-D-glucose, 4-O-β-D-galactopyranosyl-D-glucitol, 4-O-alpha-D-glucopyranosyl-D-glucitol, 6-O-alpha-D-galactopyranosyl-D-glucose, 3-O-alpha-D-galactopyranosyl-D-myo-inositol, 4-O-β-D-galactopyranosyl-D-fructose, 4-O-β-D-galactopyranosyl-β-D-glucopyranose, 6-O-alpha-D-glucopyranosyl-D-fructose, 4-O-β-D-galactopyranosyl-alpha-D-glucopyranose, 2-O-(6-deoxy-alpha-L-mannopyranosyl)-D-glucose, 4-O-alpha-D-glucopyranosyl-D-fructose, 2-O-β-D-glucopyranosyl-alpha-D-glucopyranose, 1-O-alpha-D-glucopyranosyl-D-mannitol, 6-O-(6-deoxy-alpha-L-mannopyranosyl)-β-D-glucopyranose, 2-O-β-D-glucopyranosyl-β-D-glucopyranose, 6-O-alpha-D-glucopyranosyl-alpha-6-glucopyranose, 2-O-alpha-D-glucopyranosyl-alpha-D-glucopyranose, 2-O-alpha-D-glucopyranosyl-β-D-glucopyranose, 1-O-alpha-D-glucopyranosyl-D-fructose, 6-O-alpha-D-glucopyranosyl-alpha-D-fructofuranose, 6-O-alpha-D-glucopyranosyl-D-glucitol, 4-O-β-D-galactopyranosyl-D-glucitol, 4-O-alpha-D-glucopyranosyl-D-glucitol, 1-O-alpha-D-glucopyranosyl-D-mannitol), trisaccharides, polysaccharides, in particular polyvinyl alcohols, starch, cellulose and partial esters thereof.

Examples of antioxidants comprise, but are not limited thereto, alkylphenols, hydroxyphenyl propionates, hydroxybenzyl compounds, alkylidenebisphenols, thiobisphenols and aminophenols, in particular e.g. 2,6-di-tert-butyl-4-methylphenol, 2,6-dibenzyl-4-methylphenol, stearyl 3-(3'-5'-di-tert-butyl-4'-hydroxyphenyl)propionate, 4,4'-thiobis(3-methyl-6-tert-butylphenol), 4-nonylphenol, 2,2'-methylenebis(4-methyl-6-tert-butylphenol), 2,5-di-tert-butylhydroquinone, 4,4',4''-(1-thethyl-1-propenyl-3-ylidene)-tris[2-(1,1-dimethylethyl)-5-methylphenol], neutral or basic lithium, magnesium, calcium and aluminum salts thereof, and sterically hindered amines and/or phosphonites and mixtures thereof.

Examples of co-stabilizers from the group of metal salts include, but are not limited thereto, hydroxides, oxides, carbonates, basic carbonates and carboxylic acid salts of lithium, sodium, potassium magnesium, calcium, aluminum, titanium and the like, as long as no heavy metal is used. In one embodiment of the present invention, the metal salts can be salts of higher carboxylic acids, for example $C_6$-$C_{22}$-carboxylic acids, such as, for example, stearic, palmitic, myristic, lauric, oleic, oleinic and ricinoleic acid.

Examples of natural and synthetic minerals include, but are not limited thereto, A3-, A4-, A5-zeolites, zeolites of the mordenite, erionite, faujasite X or Y type and ZSM-5-zeolites, hydrotalcites (of the Alcamizer 1 and 4 type) and/or mixtures thereof.

Examples of co-stabilizers from the group of amino acid derivatives include, but are not limited thereto, glycine, alanine, lysine, tryptophan, acetylmethionine, pyrrolidonecarboxylic acid, α-aminocrotonic acid, α-aminoacrylic acid, α-aminoadipic acid and the like, and the corresponding esters thereof. The alcohol components of these esters can include monofunctional alcohols, such as, for example, methyl alcohol, ethyl alcohol, propyl alcohol, i-propyl alcohol, butyl alcohol, α-ethylhexanol, octyl alcohol, i-octyl alcohol, lauryl alcohol, stearyl alcohol and the like, and polyols, such as, for example, ethylene glycol, propylene glycol, 1,3-butanediol, 1,4-butanediol, glycerol, diglycerol, trismethylolpropane, pentaerythritol, dipentaerythritol, erythritol, sorbitol, mannitol and the like.

Examples of co-stabilizers from the group of esters of phosphorous acid include, but are not limited thereto, triaryl phosphites, such as, for example, triphenyl phosphite, tris(p-nonylphenyl) phosphite; alkyl aryl phosphites, such as, for example, monoalkyl diphenyl phosphites, e.g. diphenyl isooctyl phosphite, diphenyl isodecyl phosphite; and dialkyl monophenyl phosphites, such as, for example, phenyl diisooctyl phosphite, phenyl diisodecyl phosphite; and trialkyl phosphites, such as triisooctyl phosphite, tristearyl phosphite and the like.

Examples of co-stabilizers from the group of epoxy compounds include, but are not limited thereto, various animal and plant oils, such as, for example, epoxy-soya oil, epoxy-rape oil, epoxidized carboxylic acid esters, such as, for example, epoxidized epoxymethyl oleate, epoxybutyl oleate, epoxidized alicyclic compounds, glycidyl ethers, such as, for example, bisphenol A diglycidyl ether, bisphenol F diglycidyl ether; glycidyl esters, such as glycidyl acrylate, glycidyl methacrylate, their polymers, copolymers; and epoxidized polymers, such as epoxidized polybutadiene, epoxidized ABS, and the like.

Examples which may furthermore be mentioned are chalk or coated chalk as fillers, the fillers not being limited thereto.

A further component which can be added to the stabilizer composition of the invention is titanium dioxide. Titanium dioxide occurs in nature essentially in three modifications: anatase, brookite and rutile.

Titanium dioxide has industrial importance as a pigment both as anatase and as rutile. The high refractive indices of 2.55 (anatase) and 2.75 (rutile) are the reason for the brightening and covering power and therefore the use as a white pigment. At an appropriate dosage, rutile absorbs all light under 400 nm, that is to say the entire UV range. The absorption of anatase is shifted somewhat to shorter wavelengths. Brookite in turn shows no photocatalytic activity at all.

For exterior uses, titanium dioxide advantageously has the rutile structure. For all other uses, it can have either the anatase or the rutile structure.

Titanium dioxide can be used according to the invention in the stabilizer composition in an amount of from approximately 0.01 to approximately 20 phr. In another embodiment, titanium dioxide can be used in an amount of from approximately 0.05 to approximately 10.0 phr or from approximately 0.1 to approximately 5 phr, for example in an amount of approximately 4 phr. The titanium dioxide should be present in a finely divided and readily dispersible form.

Paraffin wax can be used, for example, as a lubricant. In one embodiment, the paraffin wax can be a mixture of alkanes with the general empirical formula $C_nH_{2n+2}$. n is an integer from 20 to 100. The mixture can comprise both straight-chain and branched-chain components, and also purely straight-chain components. Examples of paraffin waxes include, but are not limited thereto, Naftolube F™ and compounds related thereto.

Fillers can be used in an amount of from approximately 0 to approximately 100 phr or from approximately 1 to approximately 50 phr. In one embodiment of the present invention, fillers can be used in an amount of from approximately 2 to approximately 20 phr. Plasticizers can be used in an amount of from approximately 0 to approximately 100 phr, for example from approximately 0.05 to approximately 50 phr. Lubricants can be used in an amount of from approximately 0.05 to approximately 3 phr, for example from approximately 0.1 to approximately 2 phr.

The further abovementioned co-stabilizers can be used in identical amounts to the lubricants.

In order to process halogen-containing polymers with the stabilizer composition according to the invention, the processes known from the prior art can be used. Examples of such processes include, but are not limited thereto, calendering, extrusion, injection molding, blow molding and the like.

The most diverse products for various uses can be produced from the stabilized halogen-containing polymers prepared according to the invention. For example, window profiles, pipes, floor coverings, roofing felts, cable and films can be produced with the stabilized polymers according to the invention. The polymers can furthermore be used in materials, for example, also for sports boats, rotor blades for wind power installations and in wagon construction.

The CIE-Lab system is used to evaluate the color properties of the halogen-containing polymers produced in this way and products therefrom which comprise the stabilizer composition according to the invention. The CIE-Lab system is a color space specified in 1976 by the International Commission on Illumination (*Commission Internationale de l'Éclai-*

Figure 2:
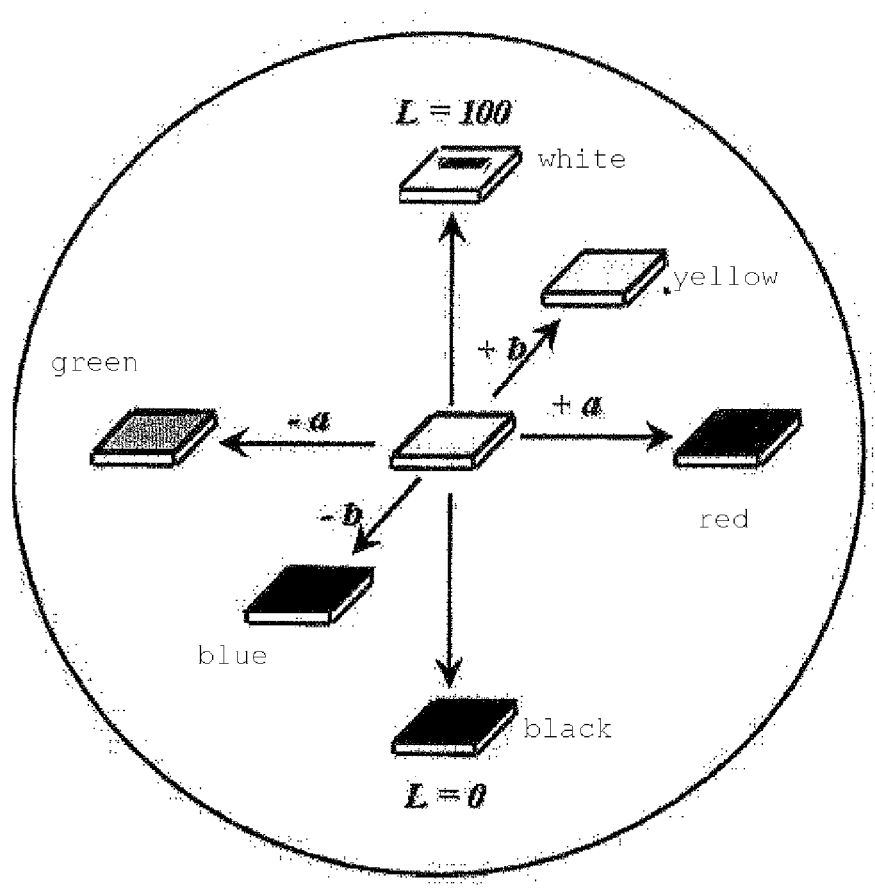
FIG. 2 illustrates a diagram for determination and archiving of a color.

*rage*, CIE). Three axes are defined in this three-dimensional color space (L=lightness (0=black, 100=white); a=red-green (−120=green, +120=red); b=yellow-blue (−120=blue, +120=yellow)). From the information on the L*a*b values and information on the color measurement apparatus (spectrophotometer), type of light, observer, color system and sample preparation, a color can be determined precisely and archived (see diagram in FIG. 2). The a value thus represents the color on the green-red axis. Negative a values indicate a greenish tinge and positive values a reddish tinge. The higher the a value, the more intense the reddish tinge. A value for a which is as neutral as possible or a slightest possible change in this value is therefore desirable in the present invention.

The present invention accordingly provides a remarkable and novel contribution to development of the prior art, in particular for processing and stabilizing PVC and other halogen-containing thermoplastic polymers.

Figure 3:
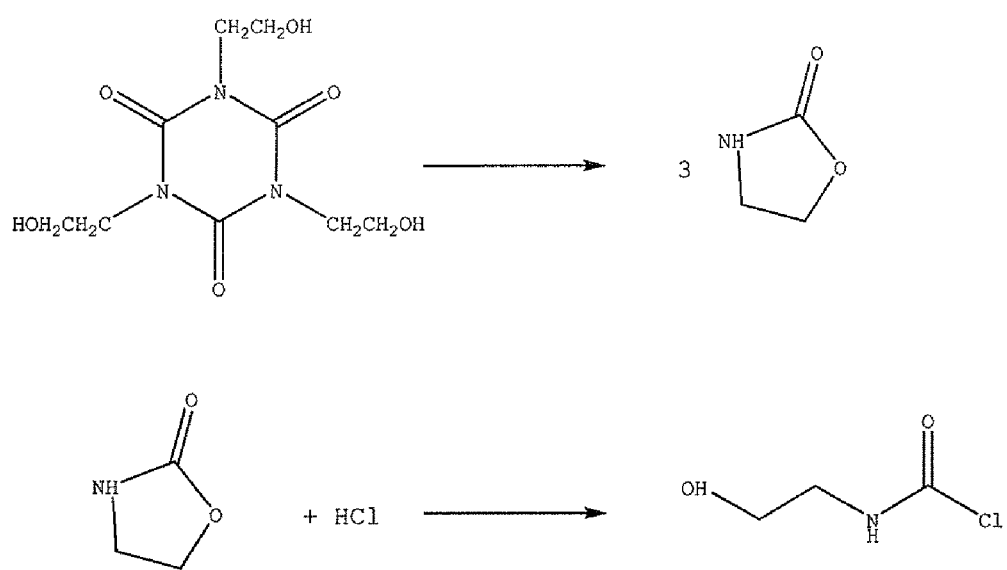
FIG. 3 illustrates the assumed action mechanism of THEIC in PVC as an acid scavenger.

It is assumed, without intending to be bound to a precise theory, that inter alia the reaction mechanism shown in FIG. 3 contributes towards the stabilizing action of the stabilizer composition according to the invention. For example, the THEIC used can be converted into an oxazolidinone, which in turn can bond the HCl liberated.

It is indeed currently known that DHP acts only with Zn components, but in the present invention, surprisingly, an activity is also to be observed without Zn. Without intending to be bound to a precise theory, perchlorate is reduced.

The activity of the present stabilizer composition results from a synergistic interaction of the components contained therein on the halogen-containing polymer.

The invention is illustrated in more detail by the following examples, but without being limited thereto.

EXAMPLES

1.) Examples 1-14

Various compositions of PVC shaped articles are described in the following examples. For the production, thereof, in addition to 100 phr of S-PVC (Solvin 267; k=67), 5 phr of chalk with a surface treatment (Hydrocorb 95), 4 phr of titanium dioxide (Kronos 2220; rutile) and 7 phr of acrylate-based impact modifier (KM 355), the constituents stated in the examples are weighed out. All the components were heated to 120° C. in a hot mixer in the course of 5 min, thereafter stored for 24 h and subsequently extruded for 90 min on a parallel 25 mm twin-screw extruder from Göttfert. The individual compositions are shown in the following Table 1.

TABLE 1

Results in PVC

| | Example | | | | | | | | | | | | | |
|---|---|---|---|---|---|---|---|---|---|---|---|---|---|---|
| | 1 nai* | 2 nai* | 3 ai* | 4 nai* | 5 nai* | 6 nai* | 7 nai* | 8 nai* | 9 ai* | 10 ai* | 11 ai* | 12 ai* | 13 ai* | 14 ai* |
| Lubricants: | | | | | | | | | | | | | | |
| Naftolube FTM (paraffin, Chemson) | | | 0.65 | 0.65 | 0.65 | 0.65 | 0.65 | 0.65 | 0.65 | 0.65 | 0.65 | 0.65 | 0.65 | 0.65 |
| ListabCa (calcium stearate) | | | 0.30 | 0.30 | 0.30 | 0.30 | 0.30 | 0.30 | 0.30 | 0.30 | 0.30 | 0.30 | 0.30 | 0.30 |
| Naftolube ELK (ester wax, Chemson) | | | 0.20 | 0.20 | 0.20 | 0.20 | 0.20 | 0.20 | 0.20 | 0.20 | 0.20 | 0.20 | 0.20 | 0.20 |
| Paraloid K125 (Rohm & Haas) | | | 1.00 | 1.00 | 1.00 | 1.00 | 1.00 | 1.00 | 1.00 | 1.00 | 1.00 | 1.00 | 1.00 | 1.00 |
| Acid scavenger: | | | | | | | | | | | | | | |
| Alcamizer 1 (Kyowa) | | | 0.40 | 0.40 | 0.40 | 0.40 | 0.40 | 0.40 | 0.40 | 0.40 | 0.40 | 0.40 | 0.40 | 0.40 |
| Antioxidant: | | | | | | | | | | | | | | |
| Irganox 1076 (Ciba) | | | 0.15 | 0.15 | 0.15 | 0.15 | 0.15 | 0.15 | 0.15 | 0.15 | 0.15 | 0.15 | 0.15 | 0.15 |
| Stabilizers: | | | | | | | | | | | | | | |
| Commercially available stabilizer-lubricant combination from Chemson based on lead | 5.00 | | | | | | | | | | | | | |
| Commercially available stabilizer-lubricant combination from Chemson based on calcium-zinc | | 4.00 | | | | | | | | | | | | |
| THEIC | | | 1.00 | 1.00 | 1.00 | 1.00 | 1.00 | | 1.00 | 1.00 | 1.00 | 1.20 | 1.50 | 1.50 |
| Na perchlorate 55% strength | | | 0.10 | 0.10 | 0.10 | 0.10 | 0.10 | 0.10 | 0.20 | 0.10 | 0.20 | 0.10 | 0.20 | 0.10 |
| Stavinor D507 (Arkema) | | | 0.20 | | | | | | 0.20 | 0.20 | 0.30 | 0.30 | 0.20 | 0.10 | 0.30 |
| BGAC | | | | | 0.20 | | | | | | | | | |
| DMAU | | | | | | 0.20 | | | | | | | | |
| DBM | | | | | | | | 0.20 | | | | | | |
| ATMER 163 (Ciba) | | | | | | | | | 1.00 | | | | | |
| DHC in min | 80.0 | 40.0 | 39.0 | 31.0 | 39.5 | 34.5 | 40.5 | 47.0 | 45.0 | 38.5 | 45.0 | 40.0 | 52.5 | 38.5 |
| L value | 94.5 | 93.8 | 95.7 | 95.1 | 95.3 | 95.0 | 94.7 | 95.5 | 95.6 | 96.1 | 95.7 | 95.7 | 95.2 | 95.9 |
| a value | −0.1 | −0.7 | −0.9 | −0.5 | −0.5 | −0.4 | −0.4 | −1.1 | −0.9 | −1.0 | −1.1 | −0.9 | −0.5 | −1.0 |
| b value | 3.9 | 3.3 | 3.4 | 4.1 | 4.0 | 3.2 | 4.3 | 4.7 | 3.3 | 3.0 | 2.9 | 3.2 | 3.1 | 2.6 |
| Initial color (yellowness index) | 9.4 | 7.1 | 7.0 | 9.1 | 8.2 | 7.5 | 9.4 | 10.2 | 7.0 | 6.9 | 6.9 | 7.0 | 7.0 | 6.8 |
| Color retention after 30 min (yellowness index) | 17.0 | 16.7 | 13.5 | 23.3 | 20.2 | 14.2 | 14.4 | 32.4 | 13.7 | 12.7 | 12.9 | 13.1 | 12.7 | 11.9 |
| a value (abs.) after 10 d Bandol Wheel | −0.1 | −0.4 | −0.5 | 0.0 | 0.3 | 1.2 | 0.0 | 0.1 | −0.5 | −0.6 | −0.8 | −0.5 | −0.1 | −0.7 |
| Δa after 10 days Bandol Wheel | 0.0 | 0.3 | 0.5 | 0.5 | 0.8 | 1.6 | 0.4 | 1.2 | 0.4 | 0.4 | 0.4 | 0.4 | 0.4 | 0.3 |

*ai = according to the invention; nai = not according to the invention;
BGAC = butylene glycol diaminocrotonate;
DMAU = dimethyl-4-aminouracil;
DBM = dibenzoylmethane (Rhodiastab 83)

Explanations to the results shown in Table 1:

It is first to be noted that the yellowness index (YI) is a measurement figure for the degree of yellowing of the sample. The initial color in this context indicates the value for the particular sample before exposure to heat. The value of the color retention is measured after exposure to heat at 180° C. for 30 min. A comparison of the values indicates the changes in the sample.

Examples 1 and 2 are commodities of Chemson, which represent stabilizer compositions according to the prior art which contain heavy metals and demonstrate the properties of the PVC during use thereof.

Example 3 corresponds to an example with a stabilizer composition according to the present invention which is free from heavy metals. Compared with Examples 1 and 2 of the prior art, which are not according to the invention, it is found in particular that with the stabilizer composition according to the invention at least a profile of properties can be established which is comparable to lead-free systems, but dispenses with any heavy metal compound. Furthermore, the stabilizer composition according to the invention in Example 3 has advantages in that the polymer obtained has an L value which is greater by more than 1 than in the case of the polymers of Examples 1 and 2. The color retention after 30 min is likewise significantly better, which can be seen from a lower yellowness index of 13.5 compared with 17.0 and, respectively, 16.7 for Examples 1 and 2.

Example 4, which is not according to the invention, differs from Example 3 according to the invention by the dihydropyridine (DHP) being left out. As a result, the dehydrochlorination (DHC), which is a measure of the static heat stability, which measures when HCl is released from the halogen-containing polymer, i.e. the stabilizer combination is spent, drops and the initial color deteriorates significantly with respect to the YI (from 7.0 to 9.1) and b value (from 3.4 to 4.1). The color retention is also significantly poorer than in Example 3 according to the invention.

In Example 5, which is not according to the invention, instead of the DHP the aminocrotonate BGAC was employed. As can be seen from the values of Examples 3 and 5, the stabilizer composition with BGAC is significantly inferior to the stabilizer composition according to the invention with DHP, both in the initial color and in the color retention.

In Example 6, which is not according to the invention, DMAU is used instead of the component DHP according to the invention. The initial color (7.5 compared with 7.0) and color retention of the polymer (14.2 compared with 13.5) are poorer in Example 6 than in Example 3 according to the invention. In particular, the L value is lower. However, Example 6 with DHC is also noticeably inferior to Example 3 according to the invention.

In Example 7, which is not according to the invention, DBM was used instead of the component DHP according to the invention. The polymer of Example 7 is also inferior to the polymer with the stabilizer composition according to the invention in the initial color (in particular in the L and in the b value, and in the yellowness index).

In Example 8, which is not according to the invention, the component THEIC according to the invention was exchanged for ATMER 163 (N-stearyl-N,N-diethanolamine), which is not according to the invention. The initial color of the polymer (in particular in the b value and yellowness index) is significantly poorer. Furthermore, the color retention is far below that required by the prior art in Examples 1 and 2.

Examples 9 to 14 according to the invention, in which the perchlorate, the DHP and the THEIC component were varied, confirm the superiority of the stabilizer components of the present invention compared with the lead-free Examples 4 to 8, which are not according to the invention.

2 cm wide strips were cut out of the abovementioned extrudates and irradiated for 48 hours in the Bandol Wheel known from the prior art (see, for example, www.metrastat.com) under the following conditions:
one revolution per hour
120° of the revolution shaded
120° of the revolution in a reservoir of water with dist. water
(—in each case 60° of the shading are in air and respectively, in dist. water)
50° C. in the sample chamber
400 W medium pressure mercury lamp Strips of the extrudates were moreover introduced into the xeno-test in order to simulate natural weathering conforming to standards. The xeno-test serves to monitor the light fastness of PVC profiles. The parts to be investigated are exposed to intensive irradiation by xenon light and thereby alternately face either light or shade. The change in color of the surface is investigated precisely at intervals of time.

The weathering was carried out by filtered xenon arc irradiation in accordance with EN ISO 11341:1994. In the xeno-test alpha, the samples were irradiated at a sample chamber temperature of 40° C., a relative humidity of 60% (in the dry phase) and an irradiation intensity of 60 W/m$^2$. The phase times chosen were 102 min dry and 18 min simulation of rain with distilled water (alternating). The L a b values and the total change in color $\Delta E$, which is shown in FIG. 1, were measured at regular intervals. It is clear from FIG. 1 that Example 3 according to the invention is comparable to Examples 1 and 2, which are not according to the invention, in the artificial weathering. Example 3 is therefore suitable for use in applications exposed to natural weathering (e.g. windows or roof gutters). Examples 5 to 8, which are not according to the invention, are significantly inferior to Example 3 according to the invention. Large differences arise after approx. 2,500 to 3,000 hours. It is moreover to be pointed out that Examples 5 and 6, which are not according to the invention and contain DMAU and, respectively, BGAC instead of the component DHP according to the invention, would not comply with the standard for white window profiles. At 4,000 h a $\Delta E$ of >5 is reached.

With respect to the a values measured, it can be observed that Examples 1 and 2, which are not according to the invention, have a $\Delta a$ of 0.0 and 0.3 respectively after the test for pink discoloration, the absolute a values remaining <0. That is to say a greenish tinge is found.

Examples 5, 6 and 8, which are not according to the invention, have the highest $\Delta a$ values, the absolute a values being >0. That is to say a reddish tinge is found.

In contrast, all the examples according to the invention have £a values of from 0.3 to 0.4, the absolute a values remaining in the green range, i.e. <0. This thus shows that the stabilizer compositions of the present invention have clear advantages over the compositions of the prior art. Furthermore, the present results show that the examples according to the invention are entirely comparable to the commodities in their tendency not to undergo pink discoloration.

2.) Examples 15-22

In the following Examples 15-22, various compositions of PVC shaped articles are described. For their production, in addition to 100 phr of S-PVC (Solvin 267; k=67) and 5 phr of chalk with surface treatment (Hydrocorb 95), the constituents mentioned in the examples were weighed out. All the components were heated to 120° C. in a hot mixer in the course of 5 min, thereafter stored for 24 h and subsequently extruded for 90 min on a parallel 25 mm twin-screw extruder from Göttfert. The individual compositions are shown in the following Table 2.

TABLE 2

| | Example | | | | | | | |
|---|---|---|---|---|---|---|---|---|
| | 15 ai* | 16 ai* | 17 ai* | 18 nai* | 19 nai* | 20 nai* | 21 nai* | 22 nai* |
| Lubricants: | | | | | | | | |
| Naftolube FTM | 0.65 | 0.65 | 0.65 | 0.65 | 0.65 | 0.65 | 0.65 | 0.65 |
| ListabCa (calcium stearate) | 0.30 | 0.30 | 0.30 | 0.30 | 0.30 | 0.30 | 0.30 | 0.30 |
| Naftolube ELK | 0.20 | 0.20 | 0.20 | 0.20 | 0.20 | 0.20 | 0.20 | 0.20 |
| Stabilizers: | | | | | | | | |
| THEIC | 0.50 | 1.00 | 1.00 | 1.00 | 1.00 | 1.00 | 1.00 | 1.00 |
| Na perchlorate 55% strength | 0.10 | 0.10 | 0.10 | 0.10 | | 0.10 | 0.10 | 0.10 |
| Stavinor D507 | 0.20 | 0.20 | 0.40 | | 0.20 | | | |
| BGAC | | | | | | 0.20 | | |
| DMAU | | | | | | | 0.20 | |
| DBM | | | | | | | | 0.20 |
| DHC in min. | 31 | 37 | 40 | 35 | 21 | 40 | 36 | 37 |
| L value | 88.8 | 88.2 | 89.3 | 87.0 | 87.9 | 86.8 | 87.8 | 86.8 |
| a value | −2.2 | −2.0 | −1.8 | −0.1 | −1.9 | −1.0 | −0.2 | 0.0 |
| b value | 12.0 | 10.6 | 10.1 | 14.4 | 11.2 | 15.8 | 12.9 | 14.5 |
| Initial color (yellowness index) | 7.6 | 15.2 | 13.1 | 20.4 | 16.2 | 27.2 | 18.2 | 29.0 |
| Color retention after 30 min (yellowness index) | 28.4 | 19.0 | 20.3 | 36.5 | 25.5 | 34.4 | 22.4 | 27.8 |

*ai = according to the invention; nai = not according to the invention

The combinations according to the invention in Example 15 to 17 show that
THEIC increases the heat stability in the DHC (cf. Example 15 to Example 16)
DHP 507 increases the heat stability in the DHC (cf. Example 16 to Example 17).

If the necessary component DHP 507 is left out (see Example 18, which is not according to the invention, in comparison with Example 16 according to the invention), the heat stability DHC drops, the sample becomes darker (=L value drops) and yellower (b value rises). It can moreover be observed that the initial color and the color retention become poorer.

If the component NaClO₄ according to the invention is left out (see Example 19, which is not according to the invention, compared with Example 16 according to the invention), the heat stability falls to almost half and the color retention is somewhat poorer.

If the component DHP 507 according to the invention in Example 16 is replaced by BGAC (see Example 20, which is not according to the invention, compared with Example 16 according to the invention), somewhat more heat stability DHC is achieved, but the sample overall becomes darker (=L value drops) and yellower (b value rises). It can moreover be observed that the initial color and the color retention become poorer.

If the component DHP 507 according to the invention in Example 16 is replaced by DMAU (see Example 21, which is not according to the invention, compared with Example 16 according to the invention), a comparable heat stability DHC is achieved, but the sample becomes darker (=L value drops) and yellower (b value rises). It can moreover be observed that the initial color and the color retention become poorer.

If the component DHP 507 according to the invention in Example 16 is replaced by DBM (see Example 22, which is not according to the invention, compared with Example according to the invention), a comparable heat stability DHC is achieved, but the sample becomes darker (=L value drops) and yellower (b value rises). It can moreover be observed that the initial color and the color retention become poorer.

These examples therefore also show that the stabilizer compositions of the present invention have clear advantages over the compositions of the prior art.

The invention claimed is:

1. A halogen-containing polymer comprising an isocyanurate-based stabilizer composition which is free from heavy metals, said isocyanurate-based stabilizer composition comprising, as main components, at least one isocyanurate, at least one dihydropyridine and at least one perchlorate salt, wherein the amount present of the isocyanurate is 0.5 to 1.2 phr (parts per hundred of resin), the amount present of the dihydropyridine is 0.1 to 0.5 phr and the amount present of the perchlorate salt is 0.05 to 0.20 phr, and wherein the amount present of any other stabilizing component that may be present is in each case smaller than that of each of the main components.

2. The polymer of claim 1, wherein the at least one isocyanurate is a compounds having the structure of formula (I)

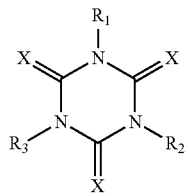

(I)

wherein $R_1$, $R_2$ and $R_3$ independently of each other are hydrogen, optionally substituted $C_1$-$C_{18}$ alkyl, optionally substituted $C_2$-$C_6$ alkenyl, optionally substituted $C_1$-$C_4$ alkoxy, optionally substituted $C_5$-$C_8$ cycloalkyl, optionally substituted $C_3$-$C_8$ alkylcycloalkyl or optionally substituted $C_5$-$C_{10}$ aryl, and wherein each X independently is S or O.

3. The polymer of claim 2, wherein $R_1$, $R_2$ and $R_3$ independently of each other are selected from the group consisting of —CH₃, —CH₂CH₃, —CH₂CH₂CH₃, —CH₂OH, —CH₂CH₂OH, —CH₂CH₂CH₃, —CH₂CH₂CH₂OH and —CH₂(C₂H₃O).

4. The polymer of claim 2, wherein X=O.

5. The polymer of claim 1, wherein the at least one isocyanurate is selected from the group consisting of

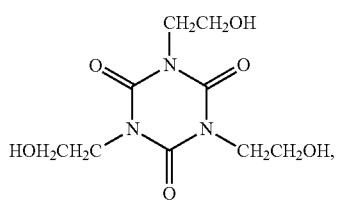

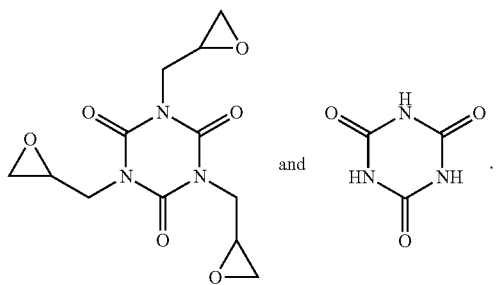

6. The polymer of claim 1, wherein the at least one dihydropyridine is selected from the group consisting of compounds having the structures of formula (II) and (III)

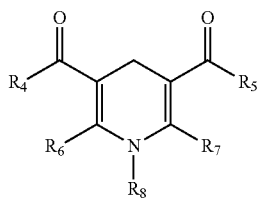
(II)

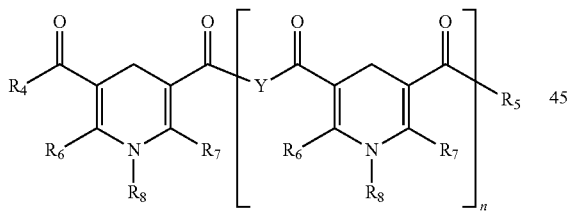
(III)

wherein $R_4$, $R_5$, $R_6$, $R_7$ and $R_8$ independently of each other are H, optionally substituted $C_1$-$C_{18}$ alkyl, optionally substituted $C_2$-$C_6$ alkenyl, optionally substituted $C_1$-$C_4$ alkoxy, optionally substituted $C_5$-$C_8$ cycloalkyl or optionally substituted $C_5$-$C_{10}$ aryl; Y is $C_1$-$C_{18}$ alkyl, wherein one or more carbons can be substituted by O or S; and n is an integer from 1 to 5.

7. The polymer of claim 6, wherein $R_4$, $R_5$, $R_6$, $R_7$ and $R_8$ are each independently selected from the group consisting of —$CH_3$, —$C_2H_5$, —$C_8H_{17}$, —$C_{16}H_{33}$, —$C_{17}H_{35}$, —$C_{18}H_{37}$, —$C_6H_5$, —$OCH_3$, —$OC_2H_5$, and —$OC_{12}H_{25}$.

8. The polymer of claim 6, wherein Y is selected from the group consisting of $(CH_2)_x$, $(CH_2)_x$—O—$(CH_2)_y$, and $(CH_2)_x$—S—$(CH_2)_y$, wherein x and y independently are an integer from 1 to 10.

9. The polymer of claim 6, wherein the at least one dihydropyridine is selected from the group consisting of

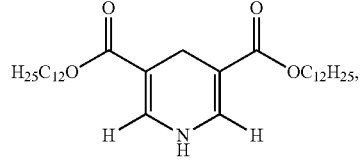

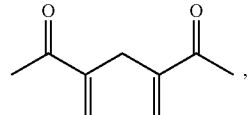

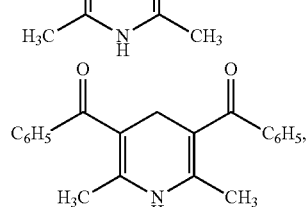

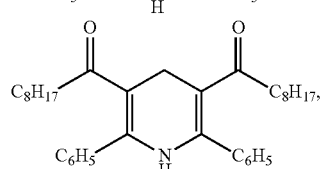

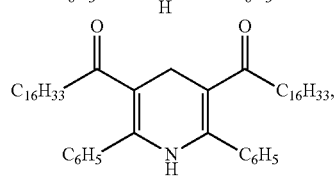

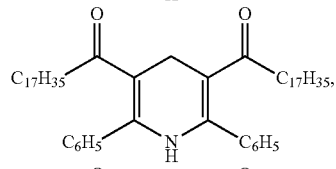

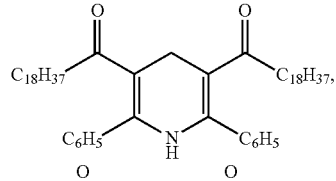

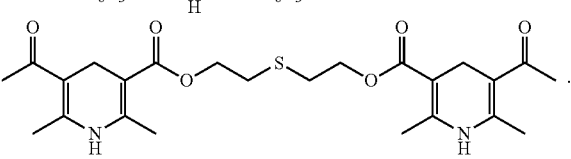

10. The polymer of claim 1, wherein the at least one perchlorate is selected from the group consisting of the compounds of formulae (IV) and (V), $$M(ClO_4)_k \quad (IV)$$

$$M_xAl_2(OH)_{2x+4}(CO_3)_{1-z/2}(ClO_4)_z \cdot mH_2O \quad (V)$$

wherein M is Li, Na, K, Mg, Ca or Al; k is an integer from 1 to 3; x is an integer from 1 to 6; and z is a number in the range of from 0.01 to 2.

11. The polymer of claim 10, wherein the perchlorate is selected from the group consisting of $NaClO_4$, $Ca(ClO_4)_2$, $Mg(ClO_4)_2$ and $Al(ClO_4)_3$.

12. The polymer of claim 11, wherein the perchlorate is present in an amount of approximately 0.1 parts per 100 parts of resin (phr).

13. The polymer of claim 11, wherein the perchlorate is $NaClO_4$.

14. The polymer of claim 1, which additionally contains at least one co-stabilizer.

15. The polymer of claim 1, further comprising one or more components selected from the group consisting of primary stabilizers, zeolites, antioxidants, fillers, plasticizers, dyestuffs, pigments, antistatic agents, surface-active agents, foaming agents, impact modifiers and UV stabilizers.

16. The polymer of claim 1, wherein the halogen-containing polymer is polyvinyl chloride (PVC).

17. The polymer of claim 1, wherein the stabilizer composition contains no uracils and/or aminocrotonates.

18. A method for stabilizing halogen-containing polymers comprising adding the stabilizer composition of claim 1 to a halogen-containing polymer.

19. The method of claim 18, wherein the stabilization is against the action of light.

20. The method of claim 18, wherein the halogen-containing polymer is polyvinyl chloride (PVC).

21. A shaped article of manufacture comprising a halogen-containing polymer of claim 1.

22. The shaped article of claim 21, wherein the shaped article of manufacture is selected from the group consisting of window profiles, pipes, floor coverings, roofing felts, cable and films.

23. The polymer of claim 1, wherein the at least one isocyanurate is

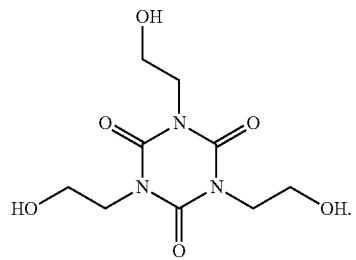 [SMILES: O=c1n(CCO)c(=O)n(CCO)c(=O)n1CCO]

* * * * *

UNITED STATES PATENT AND TRADEMARK OFFICE
CERTIFICATE OF CORRECTION

PATENT NO. : 8,772,382 B2  Page 1 of 1
APPLICATION NO. : 13/131232
DATED : July 8, 2014
INVENTOR(S) : Bernhard Pelzl et al.

It is certified that error appears in the above-identified patent and that said Letters Patent is hereby corrected as shown below:

In the Specification

In column 4 at line 35 (approx.), Change "ring" to --1 ring--.

In column 8 at line 44, Change "malititol," to --maltitol,--.

In column 8 at line 45, Change "galactoyranosyl" to --galactopyranosyl--.

In column 8 at line 64, Change "alpha-6" to --alpha-D--.

In column 9 at line 15 (approx.), Change "thethyl" to --methyl--.

In column 10 at line 33 (approx.), Change "Naftolube F™" to --Naftolube FTM--.

In column 12 at line 14 (approx.), Change "production," to --production--.

In column 12 at line 16 (approx.), Change "Hydrocorb" to --Hydrocarb--.

In column 14 at line 14, Change "lamp" to --lamp.--.

In column 14 at line 29, Change "color AE," to --color ΔE,--.

In column 14 at line 53, Change "£a values" to --Δa values--.

In column 14 at line 66, Change "Hydrocorb" to --Hydrocarb--.

In column 16 at line 6, Change "according" to --16 according--.

Signed and Sealed this
Seventh Day of April, 2015

Michelle K. Lee
*Director of the United States Patent and Trademark Office*